G. B. JACKSON.
RADIATOR AND PROCESS OF AND APPARATUS FOR PRODUCING SAME.
APPLICATION FILED APR. 23, 1917.

1,350,022.

Patented Aug. 17, 1920.
7 SHEETS—SHEET 1.

Witness:
H. S. Gaither

Inventor:
George B. Jackson
by William L. Hall
Atty.

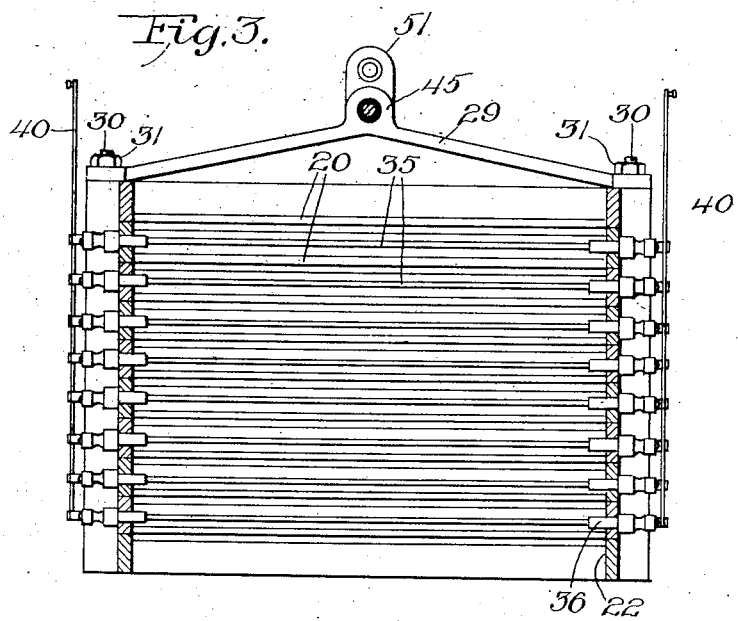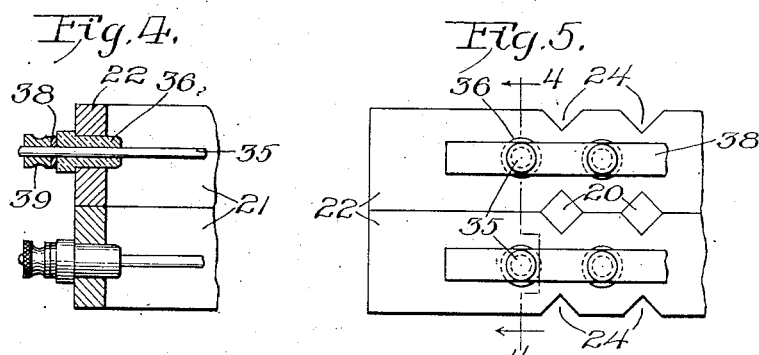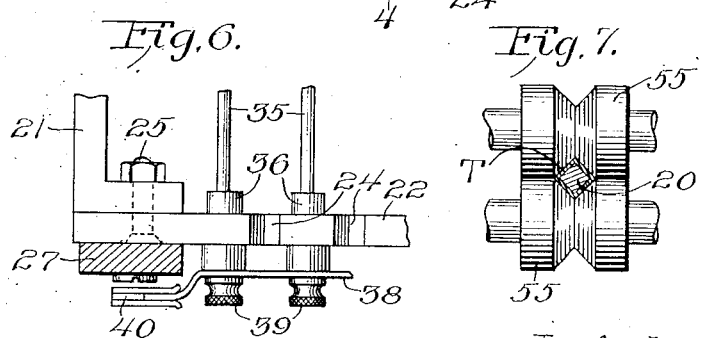

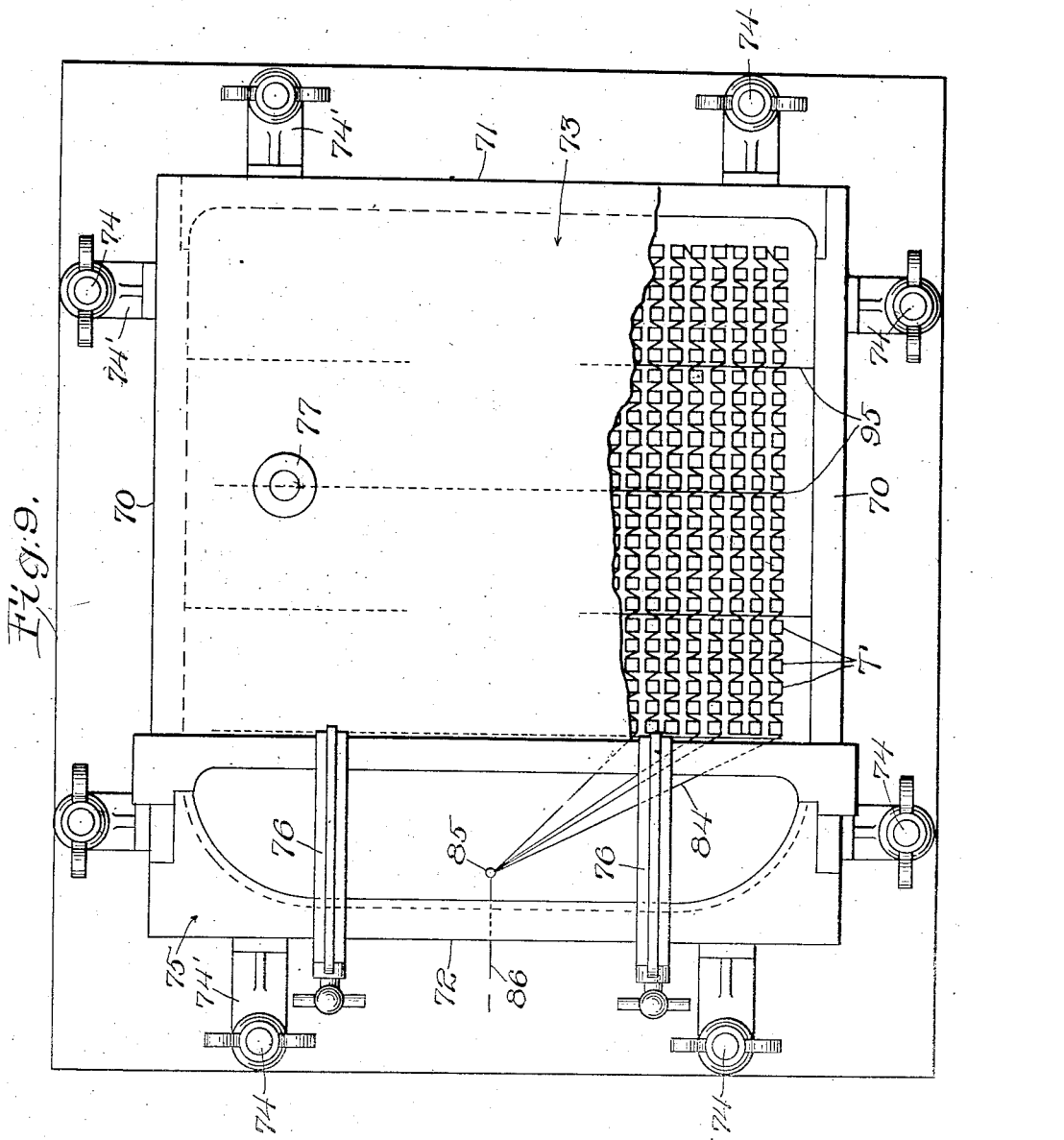

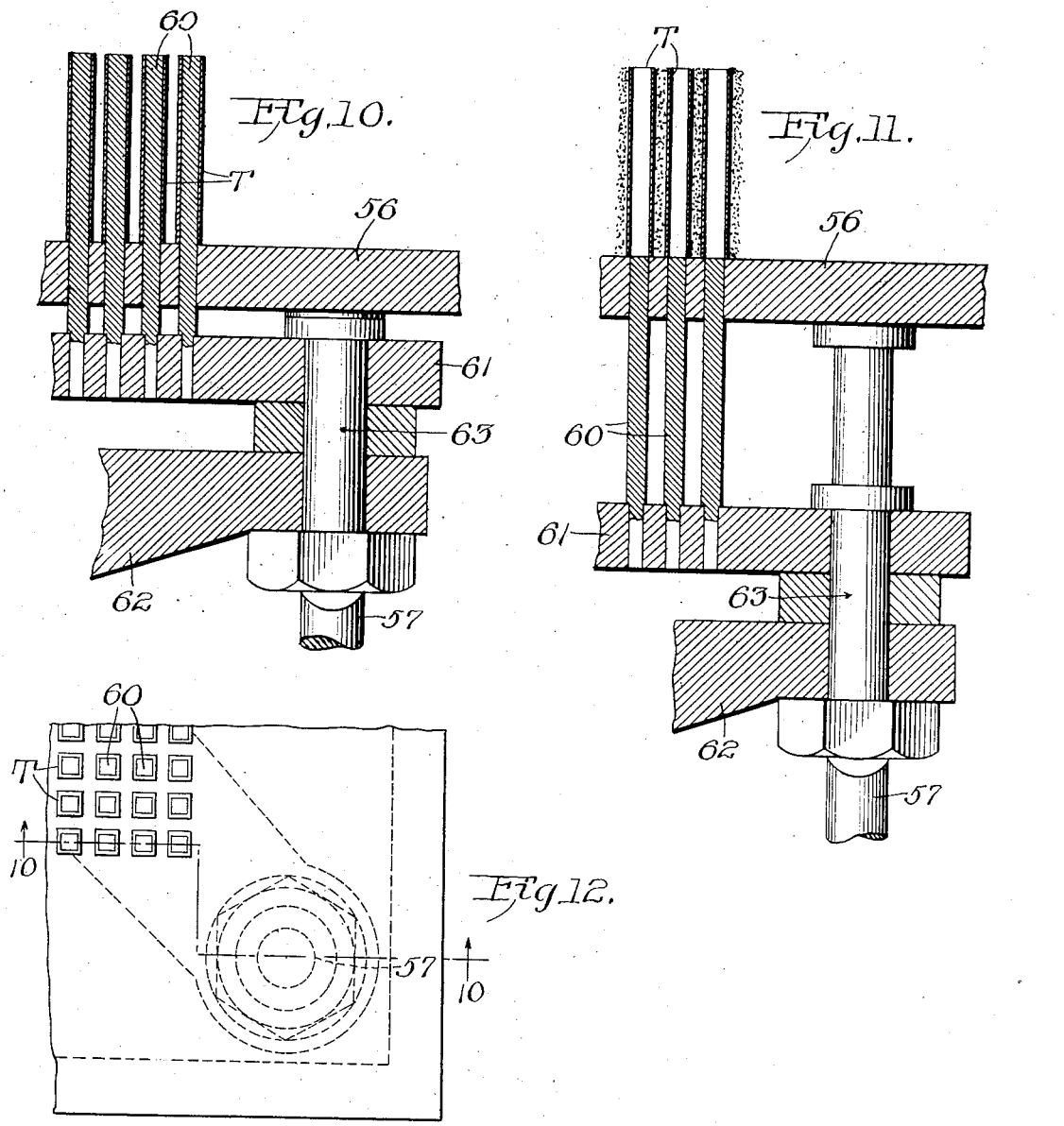

G. B. JACKSON.
RADIATOR AND PROCESS OF AND APPARATUS FOR PRODUCING SAME.
APPLICATION FILED APR. 23, 1917.
1,350,022.
Patented Aug. 17, 1920.
7 SHEETS—SHEET 6.
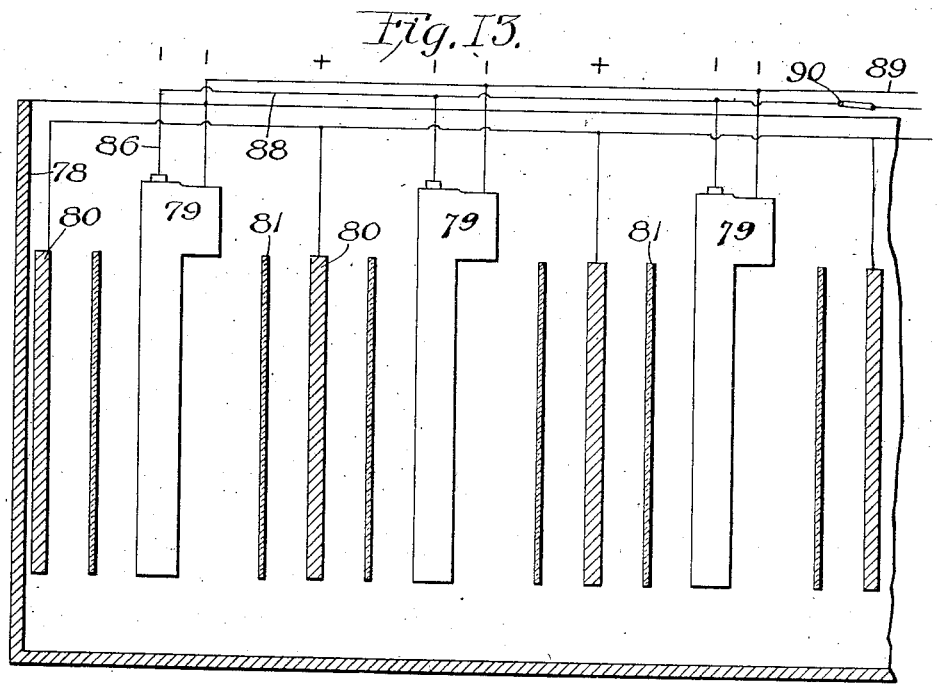
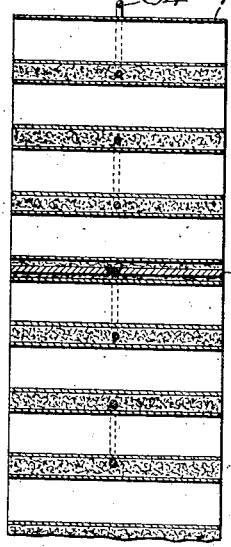
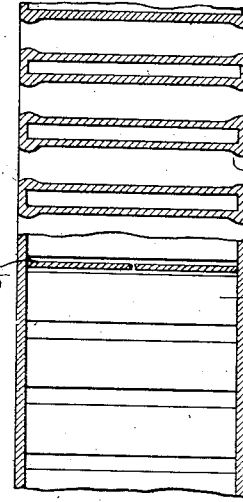
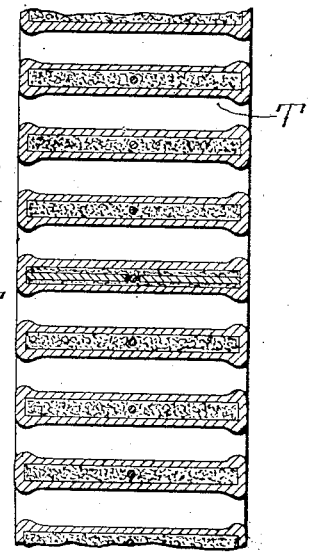
Witness:
H. S. Gaither
Inventor:
George B. Jackson
by William R. Hall
Atty.

G. B. JACKSON.
RADIATOR AND PROCESS OF AND APPARATUS FOR PRODUCING SAME.
APPLICATION FILED APR. 23, 1917.
1,350,022.
Patented Aug. 17, 1920.
7 SHEETS—SHEET 7.
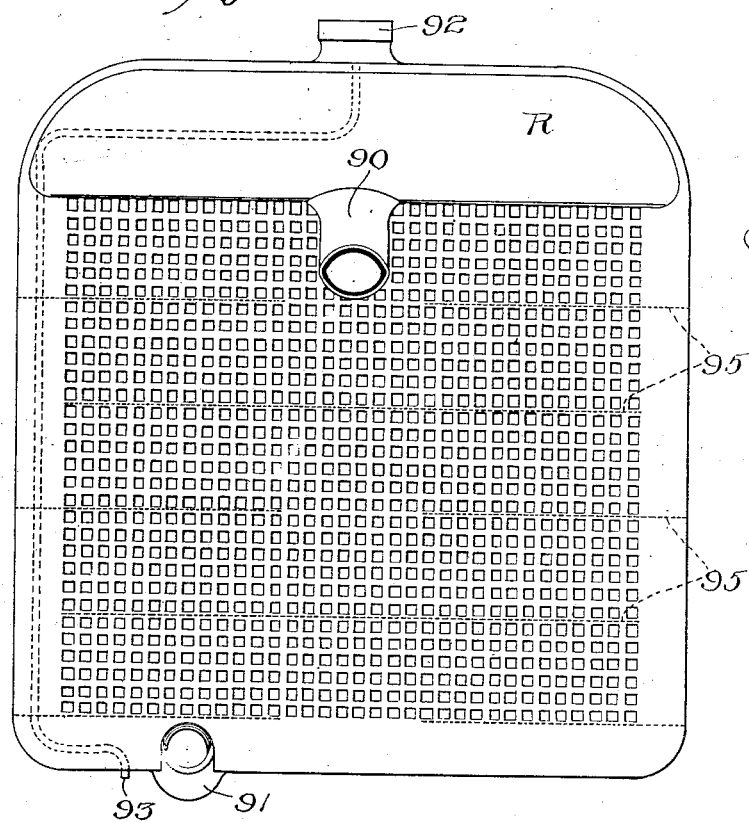
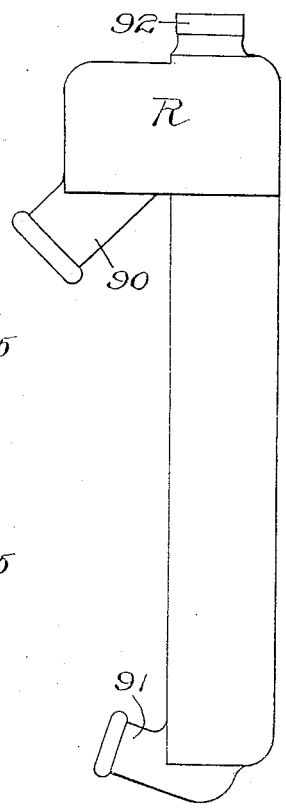
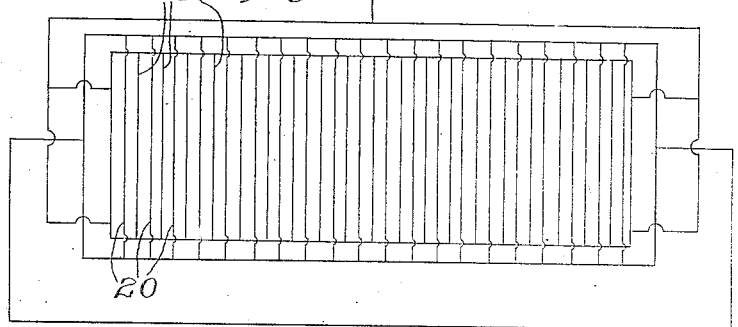
Witness:
H. S. Gauthier
Inventor:
George B. Jackson
by William L. Hall

UNITED STATES PATENT OFFICE.

GEORGE B. JACKSON, OF CHICAGO, ILLINOIS.

RADIATOR AND PROCESS OF AND APPARATUS FOR PRODUCING SAME.

1,350,022.  Specification of Letters Patent.  Patented Aug. 17, 1920.

Application filed April 23, 1917. Serial No. 163,845.

*To all whom it may concern:*

Be it known that I, GEORGE B. JACKSON, a citizen of the United States, and a resident of Chicago, in the county of Cook and State of Illinois, have invented certain new and useful Improvements in Radiators and Processes of and Apparatus for Producing Same; and I do hereby declare that the following is a full, clear, and exact description thereof, reference being had to the accompanying drawings, and to the characters of reference marked thereon, which form a part of this specification.

This invention relates to a novel process of producing metallic articles by electrolytic deposition and refers to a novel process for unequally depositing the metal under control in such a way that the walls of a hollow article, thus produced will be of different thicknesses in different parts of the article. Thus, in producing a one-piece seamless radiator for automobiles by my novel process, the entire radiator may be made in a continuous plating process and the depositing energy controlled in a way to arrest the deposition of metal at the tubes where thinner walls are permissible than at the walls of the water chambers where thicker walls are desired, and also to thicken the metal at the junction of the tubes with the walls of the water chambers.

One of the objects of the invention is to provide a novel process of this character which is especially useful in the production of one-piece seamless radiators, but may also be otherwise utilized.

A radiator embodying my invention comprises the usual upper and lower water chambers connected by side chambers, the same inclosing a series or group of tubes which are open at their front and rear ends to constitute definite air passage through the radiator, and are so arranged with respect to each other and to the water chambers as to provide vertical water passages between the tubes so as to bring the water to be cooled into contact with the walls of the tubes on the sides thereof opposite to the sides against which the air impinges. In accordance with one phase of my invention the tubes are first separately produced and are thereafter properly nested and spaced in the matrix or form to produce the complete radiator, after which the electrolytic deposition of the metal takes place to complete the radiator and to join the tubes to the radiator shell. In accordance with another phase of the invention the tubes are produced by the electrolytic deposition of metal, as copper, on a suitable form or matrix and thereafter removed.

In the drawings, I have shown one practical form of apparatus for practising my process to produce the novel radiator, and will describe the same specifically with respect to the mode of producing the radiator. It will be understood, however, that the invention is not limited to this particular apparatus, nor to the particular steps of the process hereinafter described, except as to such claims wherein the particular mechanism and steps are set forth.

As shown in said drawings, Figure 1 is a side elevation of a rack or jig in which the tubes are separately formed.

Fig. 3 is a section on the line 3—3 of Fig. 1.

Fig. 4 is a detail section on the line 4—4 of Fig. 5.

Fig. 5 is an enlarged fragmentary face view of a portion of the jig.

Fig. 6 is a fragmentary section on the line 6—6 of Fig. 1.

Fig. 7 illustrates means for freeing a tube from its matrix.

Fig. 9 is a plan view thereof with parts broken away.

Fig. 10 is a fragmentary detail on the line 10—10 of Fig. 12.

Fig. 11 is a similar view showing the parts in changed position.

Fig. 12 is an enlarged fragmentary corner view of the matrix mold.

Fig. 13 is a diagrammatic view illustrating the matrices in the plating bath.

Figs. 14 and 15 are fragmentary sections of the matrix, the embedded tubes and the radiator walls.

Fig. 16 is a fragmentary section of the complete radiator.

Fig. 17 is a front elevation of a finished radiator.

Fig. 18 is an edge elevation thereof.

Fig. 19 is the wiring diagram of the tube plate forming apparatus.

Figure 1:
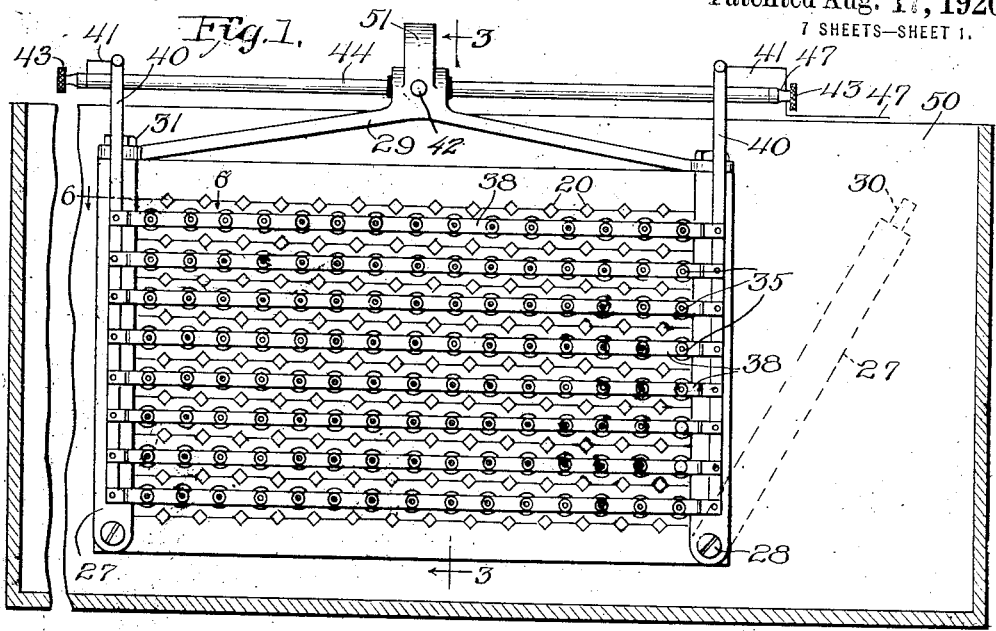

In producing a radiator in accordance with my novel method by the use of the apparatus herein shown, I first produce, by an electrolytic deposition, a plurality of tubes T each preferably of a length greater than the length of each tube of the finished radiator, so that the long length tubes may be cut to produce the lengths required for the radiator.

These tubes are formed in the apparatus shown in Figs. 1 to 7 inclusive. The said apparatus consists generally of means for supporting in suitable spaced and grouped relation a plurality of members 20 constituting matrices on which the tubes are formed. Said matrices are supported horizontally in a rack consisting of a number of superposed open rectangular frames which comprise end members 21 and side members 22, the frames being stacked one over the other in edge to edge relation. The matrices as herein shown are rectangular in cross section but may be otherwise shaped. When rectangular the side members 22 of the racks are provided with opposing or registering V-shaped recesses 24, shown best in Fig. 5, which, when the rack frames are assembled, provide a plurality of rectangular sockets to receive the ends of the matrices, whereby they are suspended in a horizontal position in the racks and are held by the notched rack frame members in definite grouping. The said end members 21 of the rack frames are connected with the side members 22 by bolts 25 passing through the side members and flanges in the end members as shown in Fig. 6. The frames may be held in their grouped assemblage by means of vertical confining members 27, one at each corner of the rack, which as herein shown are hinged at 28 to the lowermost rack frame of the group. The said confining members swing outwardly, as indicated in dotted lines in Fig. 1, and are adapted to be held in their normal rack confining positions by means of a spider 29, the arms of which are perforated at their ends to pass over screw threaded terminals 30 of the members 27. Nuts 31 screw threaded to said terminals serve to clamp the rack frames together.

Associated with the racks are a series of rods 35, which extend horizontally across the rack frame and are arranged in sets between the sets of matrices 20. Said rods constitute insoluble anodes and they are supported in the rack frame members 22 through the medium of insulating bushings 36 which are seated in the rack members 22. The anodes of each set are connected together by metal bars 38 which are apertured to receive the ends of said anodes 35 beyond the rack members, and nuts 39 screw threaded to the ends of said anodes serve to clamp the bars 38 in place. The bars 38 are connected at their ends, and at the corners of the rack, to four upright metal bars 40, which latter extend upwardly beyond the rack frame, and the upper ends of said bars 40 are connected by wires 41 with binding posts 43, 43 which are formed on a horizontal rod 44 that extends above and across the rack and is supported on and insulated from a lug 45 at the center of the spider 29. 46 designates a supply wire that is connected to the binding post 42, and 47 designates the return wire connected to one of the binding posts 43.

Figure 2:
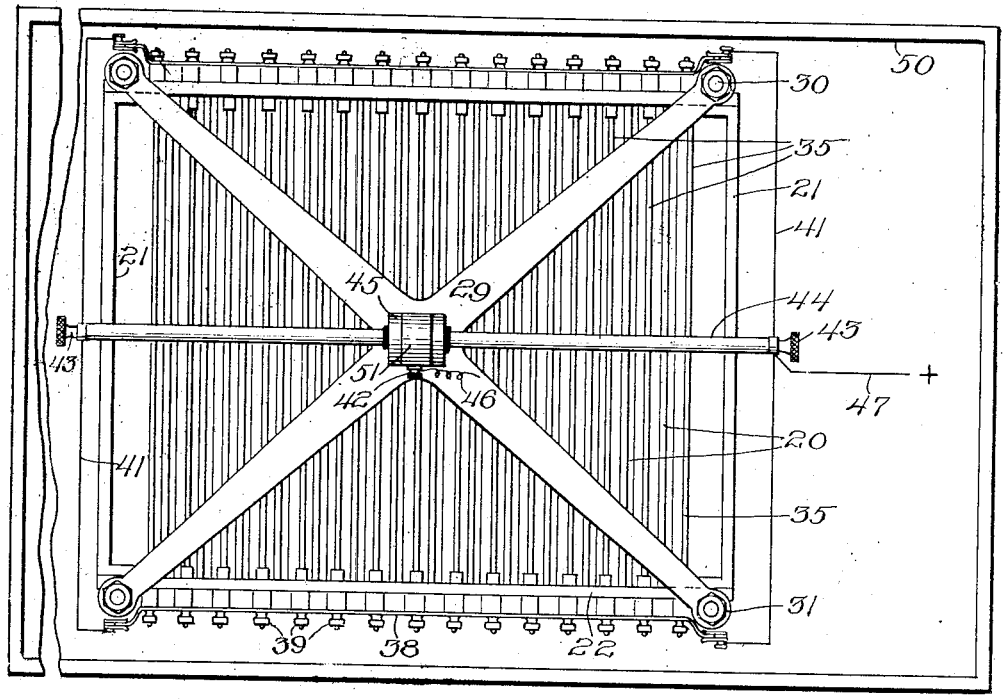
Fig. 2 is a top plan view thereof.
Figure 8:
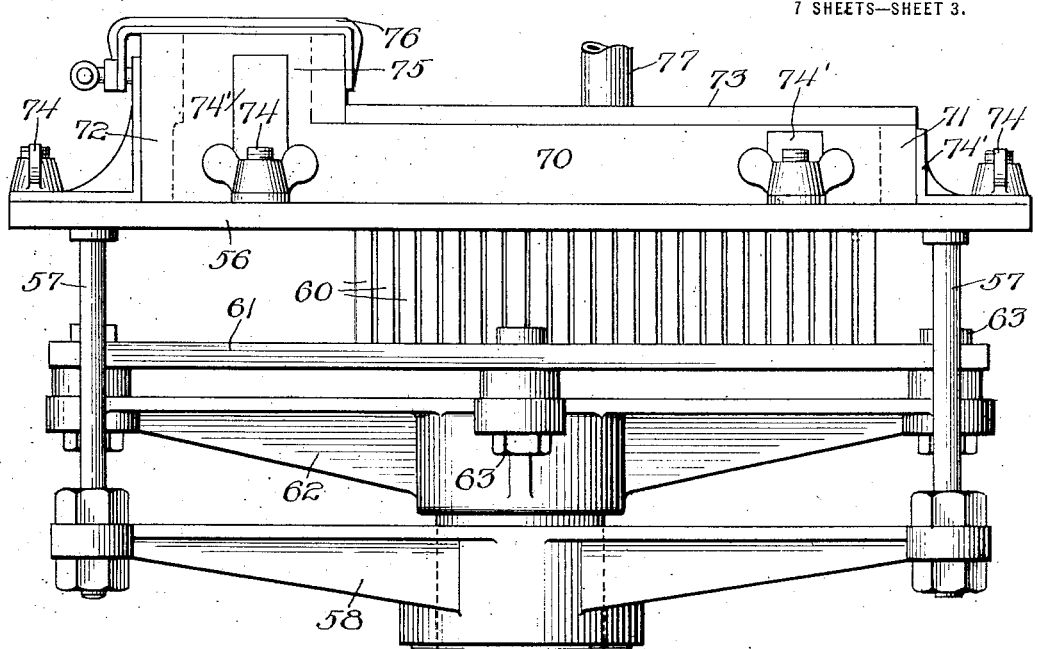
Fig. 8 is a side elevation of the molding apparatus for applying the formed tubes to the fusible material that constitutes the matrix for the entire radiator.

The rack may be supported in a plating bath, contained in a tank 50, as shown in Figs. 1 and 2, through the medium of a hanger 51 constituting part of the spider 29 and a cable (not shown) attached to the hanger and suspended from any suitable overhead support.

The metal to be deposited is contained in solution in the electrolyte. The anodes 35, as before stated, are made of an insoluble metal, as, for instance, a gold plated anode may be used when depositing copper. In preparing the matrices or cathodes for the deposit of metal thereon, they are first coated with a thin film of paraffin or like material to receive and hold a material on which the metal to be deposited is received, such for instance as graphite. After the graphite has been applied to the matrices and the rack containing the matrices has been lowered in the plating bath, the current is supplied to the circuit through the supply wire 46. The connection of the several bars 38 with the anodes and of said bars with the bus bars 40, and the connection of these bars with the binding posts 43 and 43, provides a divided or multiple circuit, so that all of the anodes receive an equal supply of current. The action of the electric current is to deposit the metal out of the electrolyte on to the matrices and when a sufficient thickness of tube wall has been obtained the current is cut off and the rack removed and the tubes with their inclosed matrices are removed from the rack. The tubes may be removed from their matrices in any suitable manner, as, for instance, passing them between rollers 55 (Fig. 7) having V-shaped co-acting faces, or other shaped faces to correspond to the cross section of the tubes. After the tubes have been removed from their matrices they are cut into lengths to correspond to the length of radiator tube required.

After the tubes have been cut to proper radiator length they are embedded in a matrix on which is deposited the material to constitute the radiator shells and with which the tubes are made integral. The machine or apparatus for accomplishing this result is shown in Figs. 8 to 12 inclusive.

It comprises a horizontal mold table 56 which is supported at four points on posts 57 that are carried by the outer ends of the arms of a spider 58, which spider is in turn supported on or made part of a vertical, centrally disposed cylinder 59 that is supported on a base casting 65. Said mold table is provided with numerous, regularly spaced and grouped perforations through which are adapted to extend centering pins 60 that are supported at their lower ends by a vertically reciprocable horizontal plate 61. Said plate 61 is supported at four points on the outer ends of the arms or a spider 62, said arms being attached to the reciprocable plate by bolts 63. The spider 62 is supported on the upper end by a piston 64 which reciprocates in the cylinder 59. The piston may be hydraulically actuated or operated by liquid admitted to the cylinder through a pipe 66; or the piston may be manually operated through the medium of a treadle bar 67 that is pivoted to the base 65 and is connected at its inner end to a stem 68 depending from the piston and slidable in a stuffing box in the head of the cylinder.

The said mold is supplemented by removable vertical side walls 70, 70 and end walls 71, 72 which, together with a top wall 73, constitutes a knock down mold. Said removable walls may be locked together and to the mold table by any suitable form of locking device familiar in molding practice, such, for instance, as screws 74, extending through brackets 74', of the mold walls and seated in the mold table. At one end of the mold is formed an extension 75 in which is molded that portion of the matrix on which is formed by electrolytic deposition what is termed the rear overhanging portion R of the radiator shown in Figs. 17 and 18. The said extension is formed of separable parts that are held together by clamps 76. 77 designates the pouring opening of the mold through which the matrix material, in a molten state, is admitted to the mold.

The operation of molding the radiator matrix by the use of the apparatus shown is as follows:

The piston 64 is raised either by manual or hydraulic power and has the effect to raise the plate 61 and the tube centering pins 60 supported thereon. Said pins are thus projected upwardly through the openings of the mold table 56 to the position shown in Fig. 10. Thereafter the previously cut tubes are placed over the pins as shown in Fig. 10 to grasp the tubes, whereupon the molten matrix material is poured into the mold. After said material hardens the piston is allowed to drop, carrying with it the centering pins 60 to the position shown in Fig. 11. The matrix now consists of a solid body having an exterior form to correspond to the contour of the interior space of a radiator with the grouped tubes embedded therein. The matrix is thereafter prepared for the plating processes by painting the outer surface with a suitable film of material which will receive metal deposited thereon as, for instance, graphite coating.

Thereafter the prepared matrices are suspended in any suitable manner in a plating tank 78, as shown in Fig. 13, the matrices being diagrammatically indicated at 79. In said figure 80, 80 designates the anodes and the prepared matrices constitute the cathodes.

In order that the plating current may be carried properly to the tubes throughout their length so as to deposit the metal uniformly thereon, and in order that the different parts of the radiator structure may be differentially plated and such differential plating controlled, I may intertwine among the tubes in the mold, after they have been placed therein before the matrix material has been poured, wires 84, such, for instance, as shown in Fig. 9. Preferably a definite group of these tubes are served by one loop of wire, the several loops being carried to a common distributing point 85 which is connected by a conductor 86 to the source of plating current. For instance, as shown in Fig. 13 the loops of wires 84 are connected by wires 88 to the main circuit wires 89 which latter are connected to the cathode 79. A switch 90 placed in the circuit of the wires 88 enables the plating current for the tubes to be cut off at will without affecting the current applied to the cathodes 79. Preferably dielectric barriers 81 will be interposed between the anodes and cathodes after the switch 90 has been closed and the plating current to the tubes is cut off. By reason of the plating effect due to the application of the current to the cathodes 79 and to the loops of wires 84 simultaneously, the deposition of metal at the ends of the tubes, and therefore at the places where the tubes join the rear and front plates of the radiator shell, will be somewhat increased beyond either that of the tube or shell during the time when the two sources of energy are being transmitted to the tubes and to the shell. This added thickness of metal at the junction of the tube and shell is an advantage inasmuch as an extra thickness of metal is placed where most required and adds to the ruggedness of the radiator. After the tube plating current has been cut off the barriers 81 may be placed between the anodes and cathodes, as shown in Fig. 13, so that the principal portion of the plating energy of the current will be directed toward the shell of the radiator; the said barriers being of a dimension to only cover the tube area of the radiator and not to cover the top, bottom and side wall areas.

After the matrix has been formed and before it is inserted into the plating bath, nipples 90, 91 are applied to the overhanging extension R and to the lower chambered portion of the shell for connection with the circulation system of the engine. Also it is practical to insert in the mold prior to molding the shell matrix an over-flow tube 93, shown in Fig. 17, thereby greatly simplifying the assemblage of the tube in the radiator. Likewise the filling nozzle casting 92 is applied to the top wall of the upper water chamber of the shell.

As a further improvement in radiators of this character I may incorporate among the tubes T a number of baffle plates 95, shown best in Fig. 17 and indicated in Fig. 9. These baffle plates are placed between adjacent rows of tubes at suitable vertically spaced distances. Alternate plates extend entirely across the tube space or region of the radiator but do not extend into the side legs of the water space of the shell, while other plates extend through the side legs of the water space and are interrupted at the center of the tube space or region. This arrangement of the baffle plates has the effect to increase the length of the path of water flowing between the lower and upper chambers of the radiator and thereby increases the efficiency of the radiator to suitably cool the water. It has the further effect to render expansion and contraction of the radiator structure uniform in all its parts, thereby avoiding cracking of the radiator walls and increasing the durability of the radiator.

It will be understood that the invention is capable of considerable variation within the spirit and scope of the claims hereto appended and that the invention is not limited to the illustrated embodiment except as to claims specifically covering illustrated details, and as imposed by the prior art.

I claim as my invention:

1. The method of producing a one piece, seamless radiator which consists in separately forming radiator air tubes, grouping and holding the tubes in predetermined spaced relation by a matrix and producing by electrolytic deposition on the matrix a complete radiator shell and a union of said tubes with said shell.

2. The method of producing a one piece, seamless radiator which consists in separately forming by electrolytic deposition radiator air tubes, grouping the tubes in predetermined spaced relation and supporting them by a shell matrix and producing by electrolytic deposition and from the same metal as the tubes are formed a complete radiator shell and a union of said tubes with said shell.

3. The method of producing a one piece, seamless radiator which consists in separately forming radiator air tubes, grouping the tubes in predetermined spaced relation and supporting them by a shell matrix producing by electrolytic deposition a radiator shell on said matrix and joining the tubes to the shell walls, and regulating the deposition of the metal in a continuous operation so as to produce differential tube and shell wall thicknesses.

4. The method of producing a one piece, seamless radiator which consists in separately forming radiator air tubes, grouping the tubes, producing by electrolytic deposition a radiator shell and a union of said tubes with said shell and regulating the electrolytic deposition so that the gage of the shell walls is greater than that of the tubes and with the thickness of the walls increased at the junctions between the tubes and shell walls to reinforce the structure.

5. The improvement in the art of producing seamless radiators which consists in forming the air tubes and electrically depositing metal to form the shell walls and by means to thicken the deposition of the metal and reinforce the structure at the junction of the ends of the tubes with the shell walls.

6. The improvement in the art of producing an integral, seamless radiator, which consists in forming by electrolytic deposition the radiator tubes and thereafter forming on a tube holding matrix the radiator shell by electrolytically depositing metal the same as from which the tubes are made.

7. The improvemnt in the art of producing an integral, seamless radiator, which consists in separately forming the radiator tubes and thereafter producing by electrolytic deposition the complete radiator shell and at the same time joining the tubes to the shell walls.

8. The improvement in the art of producing a one piece, seamless radiator which consists in separately forming the air tubes in a shell forming matrix, grouping and supporting said tubes, and electrolytically forming the complete radiator shell and integrally joining the tubes thereto.

9. The improvement in the art of electrolytic deposition to form articles, which consists in the application of electric current to produce electrolytic deposition of metal by branched circuits, and controlling one circuit relative to the other at will to effect differential deposition of the metal.

10. The improvement in the art of producing a one piece seamless radiator which consists in separately forming the air tubes, grouping said tubes, electrolytically forming the radiator shell and joining the tubes thereto, and differentially applying the current to said tubes and shell to thicken the joints between the tubes and shell walls.

11. The improvement in the art of producing a one piece, seamless radiator which consists in separately forming the air tubes, grouping said tubes, electrolytically forming the radiator shell and joining the tubes thereto, differentially applying the current to the tubes and shell and controlling the application of the deposition current to the tubes, relatively to the shell at will.

In witness whereof I claim the foregoing as my invention, I hereunto append my signature, in the presence of two witnesses, at Chicago, Illinois, this 11th day of April, 1917.

GEORGE B. JACKSON.

Witnesses:
W. L. HALL,
A. E. WALBRIDGE.